United States Patent
Bai et al.

(10) Patent No.: US 8,634,997 B2
(45) Date of Patent: Jan. 21, 2014

(54) DIRECT CLUTCH CONTROL FOR DUAL CLUTCH TRANSMISSIONS

(75) Inventors: Shushan Bai, Ann Arbor, MI (US); Vijay A. Neelakantan, Rochester Hills, MI (US); Paul G. Otanez, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 93 days.

(21) Appl. No.: 13/097,912

(22) Filed: Apr. 29, 2011

(65) Prior Publication Data
US 2012/0277964 A1    Nov. 1, 2012

(51) Int. Cl.
*G06F 7/00* (2006.01)
*G06F 17/00* (2006.01)

(52) U.S. Cl.
USPC .......................................................... 701/67

(58) Field of Classification Search
USPC .......................................................... 701/65
See application file for complete search history.

(56) References Cited

U.S. PATENT DOCUMENTS

| | | | |
|---|---|---|---|
| 5,121,820 A * | 6/1992 | Brown et al. | 192/3.3 |
| 5,123,302 A * | 6/1992 | Brown et al. | 477/154 |
| 5,189,618 A * | 2/1993 | Tsujii et al. | 701/93 |
| 5,626,534 A * | 5/1997 | Ashley et al. | 477/79 |
| 7,257,522 B2 * | 8/2007 | Hagiwara et al. | 703/8 |
| 7,546,196 B2 * | 6/2009 | Izumi et al. | 701/51 |
| 2008/0171633 A1 * | 7/2008 | Gansohr et al. | 477/175 |
| 2010/0099537 A1 * | 4/2010 | Maten et al. | 477/130 |
| 2010/0145564 A1 * | 6/2010 | Saito | 701/29 |
| 2011/0028271 A1 | 2/2011 | Whitmarsh et al. | |
| 2011/0077122 A1 | 3/2011 | Lundberg et al. | |

FOREIGN PATENT DOCUMENTS

| | | | |
|---|---|---|---|
| EP | 0043660 A2 * | 1/1982 | |
| EP | 1058019 A1 | 12/2000 | |
| WO | WO0225131 A1 | 3/2002 | |

* cited by examiner

*Primary Examiner* — Mary Cheung
*Assistant Examiner* — Frederick Brushaber

(57) ABSTRACT

A control system for controlling clutches of a dual clutch transmission includes an internal model based force control algorithm that converts a desired clutch force to a pressure control signal, a pressure control valve that receives the pressure control signal, a hydraulic actuator to which the pressure control valve applies a pressure related to the pressure control signal, and a clutch assembly with a spring lever and a plurality of clutch plates. The hydraulic actuator applies a desired force corresponding to the pressure control signal to a distal end of the spring lever such that the desired force to the distal end of the spring lever imparts an actual clutch force to the clutch plates.

14 Claims, 3 Drawing Sheets

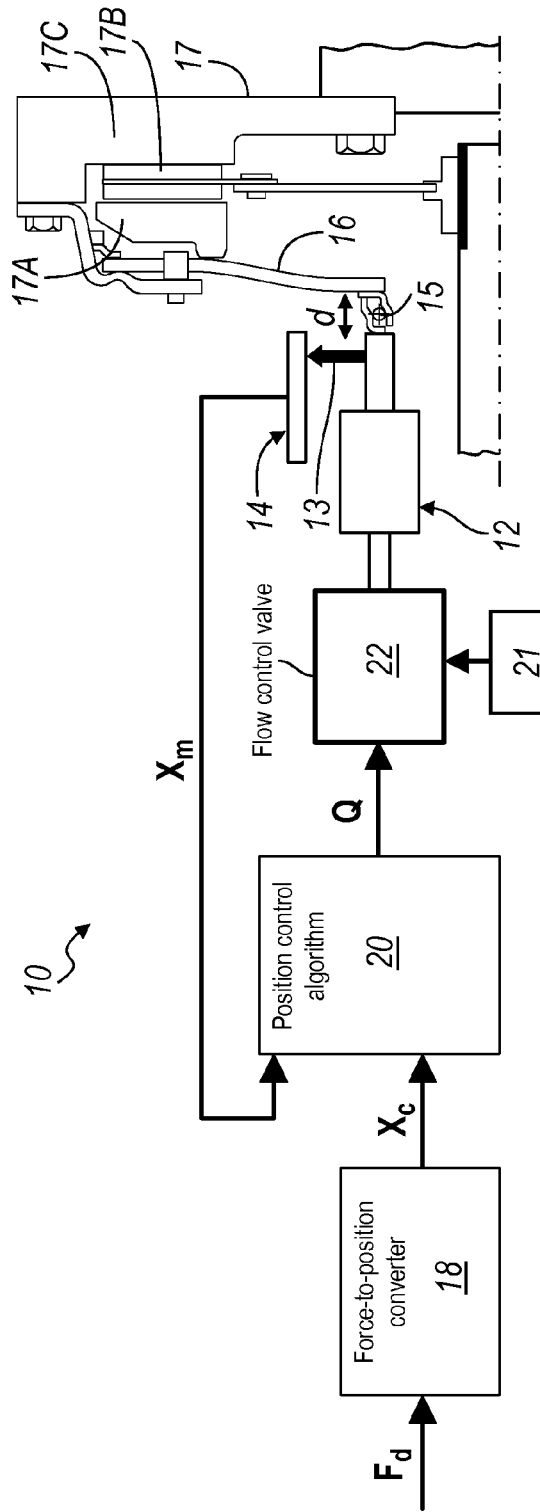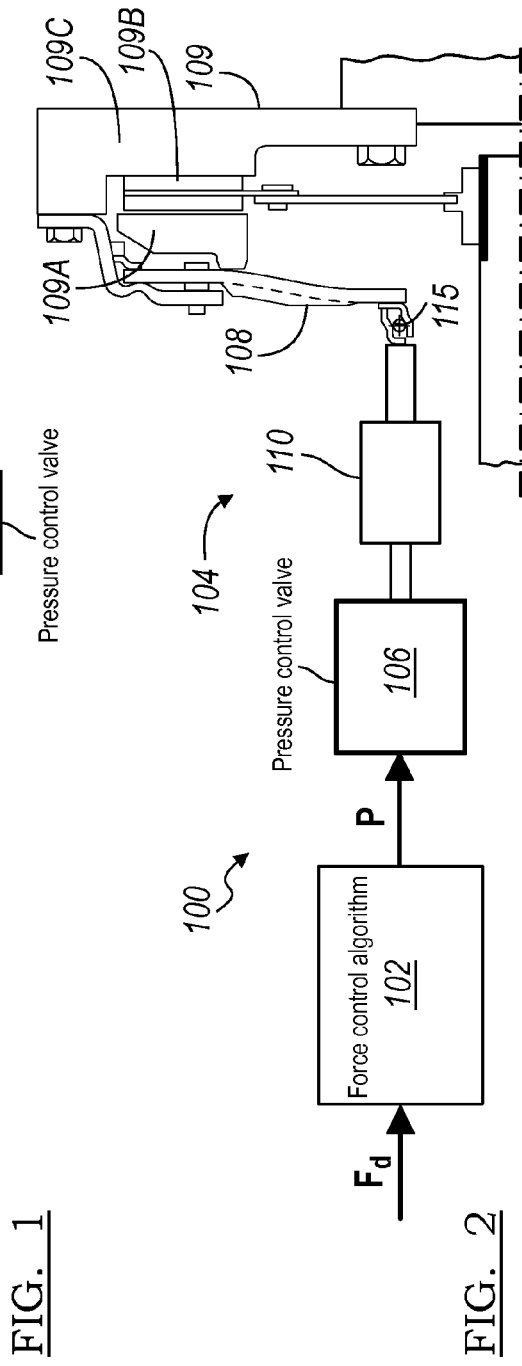
FIG. 1
FIG. 2

DIRECT CLUTCH CONTROL FOR DUAL CLUTCH TRANSMISSIONS

FIELD

The present invention relates to a system for controlling clutches in a motor vehicle transmission. More specifically, the present invention relates to a direct clutch force control system for dual clutch transmissions.

BACKGROUND

The statements in this section merely provide background information related to the present disclosure and may or may not constitute prior art.

A typical dual clutch transmission includes a pair of operating clutches which drive a pair of input shafts. The input shafts may be located on opposite sides of an output shaft or may be located concentrically between spaced-apart output shafts. A plurality of synchronizers selectively couple rotatable gears associated with the shafts to achieve forward and reverse gear ratios. Further, solenoid and valve assemblies actuate the clutches and synchronizers to achieve the forward and reverse gear ratios. Typically an electronically controlled hydraulic circuit or system is employed to control the solenoids and valve assemblies. As the clutch plates of the clutches wear, compensating for variations between the desired clutch force and the force actually applied to the clutch becomes more difficult for these electronically controlled circuits.

Accordingly, there is a need for an improved control system for dual clutch transmissions.

SUMMARY

A control system for controlling clutches of a dual clutch transmission includes an internal model based force control algorithm that converts a desired clutch force to a pressure control signal, a pressure control valve that receives the pressure control signal, a hydraulic actuator to which the pressure control valve applies a pressure related to the pressure control signal, and a clutch assembly with a spring lever and a plurality of clutch plates. The hydraulic actuator applies a desired force corresponding to the pressure control signal to a distal end of the spring lever such that the desired force to the distal end of the spring lever imparts an actual clutch force to the clutch plates.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. In the drawings:

FIG. 1 is schematic view of a conventional clutch control system;

FIG. 2 is a schematic view of a clutch control system in accordance with the principles of the present invention;

DETAILED DESCRIPTION

The following description is merely exemplary in nature and is not intended to limit the present disclosure, application, or uses.

Figure 3:
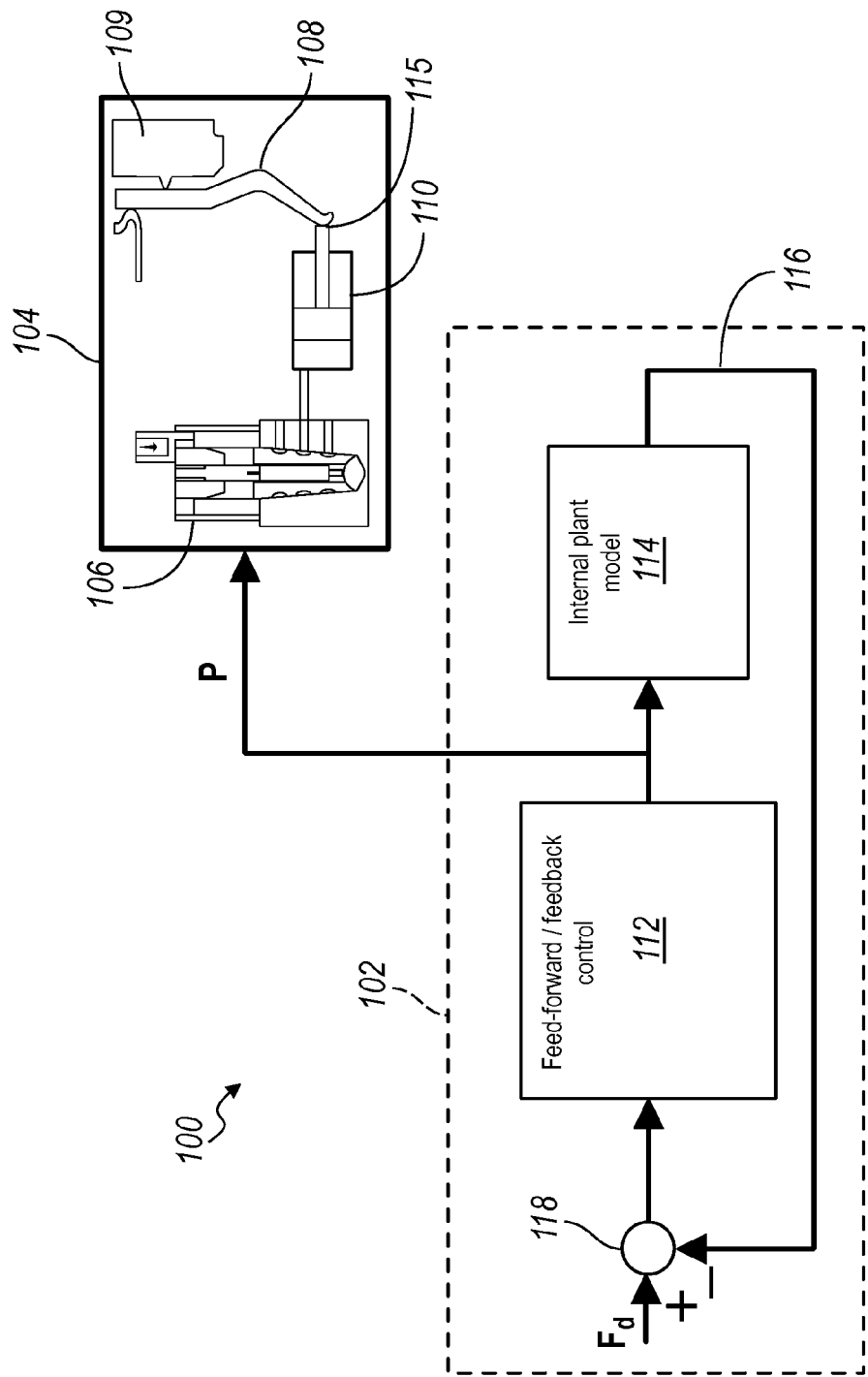
FIG. 3 is a schematic view of an internal model based force control algorithm of the system of FIG. 2 in accordance with the principles of the present invention.
Figure 4:
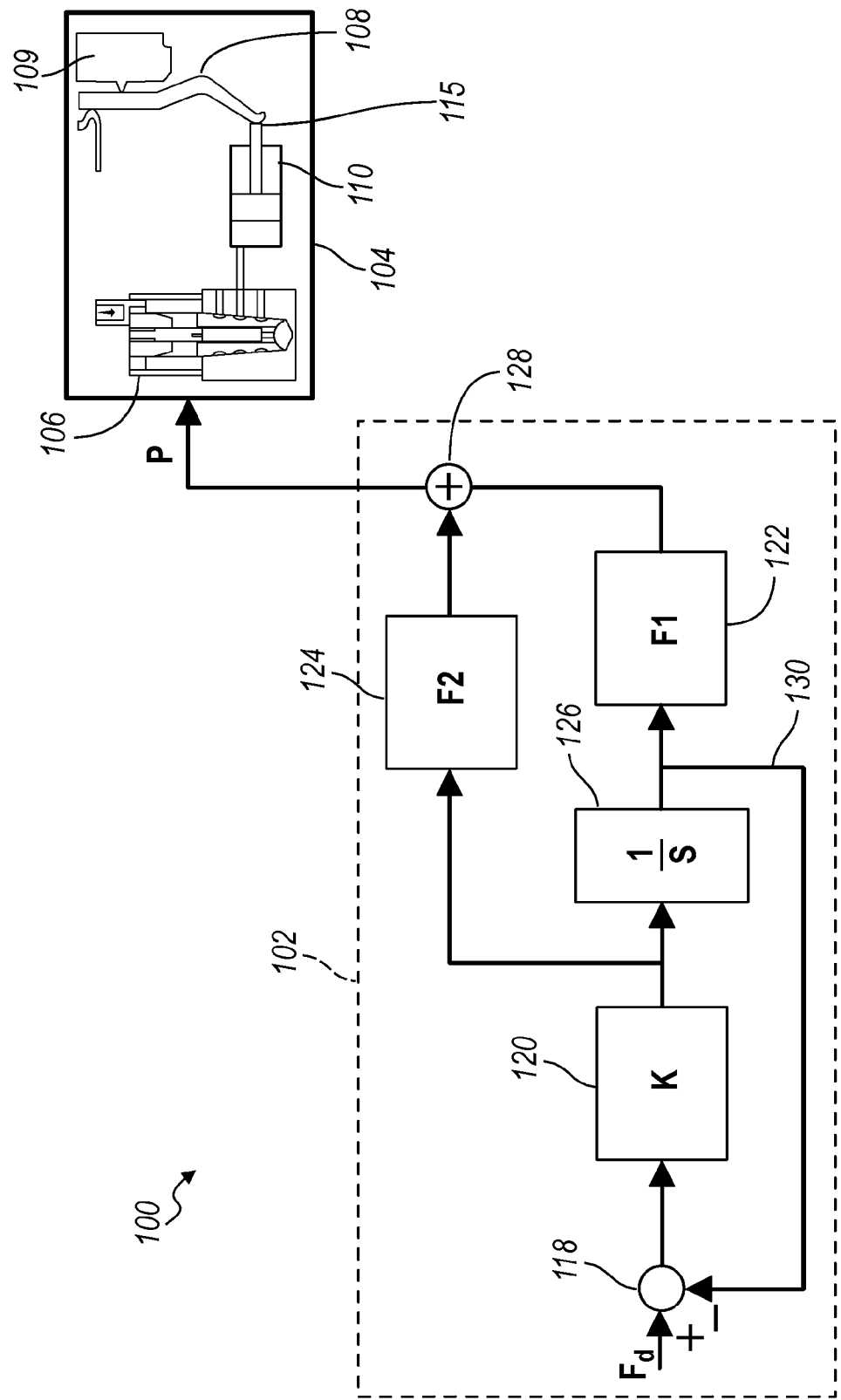
FIG. 4 is a schematic view of an implementation of the internal model based force control algorithm of FIG. 2.

Referring now to the drawings, a clutch control system embodying the principles of the present invention is illustrated in FIGS. 2 through 4 and designated at 100, and, for the sake of comparison, a conventional clutch control system is illustrated in FIG. 1 and designated at 10. These clutch control systems are associated with motor vehicle powertrains, particularly dual clutch transmissions The conventional clutch control system 10 includes a hydraulic actuator 12 and a clutch assembly 17. The clutch assembly 17 includes a set of clutch plates 17A, 17B, and 17C and a diaphragm spring lever 16. The diaphragm spring lever 16 is in contact with the clutch plate 17A and is coupled to the hydraulic actuator 12 with an applied bearing 15 near or at the distal end of the diaphragm spring lever 16.

The system 10 also includes a force-to-position convertor 18, a closed loop position control algorithm 20, a flow control valve 22, a pressure control valve 21, and a position transducer 14. During the operation of a dual clutch transmission, the clutch assembly 17 is controlled by a microprocessor. The microprocessor sends a signal, $F_d$, which is the desired clutch force, to the force-to-position convertor 18, which, in turn, converts the desired clutch force, $F_d$, to a hydraulic actuator position command, $X_c$. The force-to-position convertor 18 sends the position command, $X_c$, information to the position control algorithm 20, which generates a control signal, Q, for the flow control valve 22. The flow control valve 22 receives the control signal, Q, as well as signals from the pressure control valve 21, to adjust the position of the hydraulic actuator 12 coupled to the applied bearing 15, such that there is approximately a one-to-one correspondence between the position, d, of the applied bearing 15, and hence the deflection of the distal end of the diaphragm spring lever 16, and the actual force applied to the clutch plates 17A, 17B, and 17C of the clutch assembly 17.

Note that the position transducer 14 receives a signal 13 associated with the position, d, of the applied bearing 15 and transmits the measured position, $X_m$, of the hydraulic actuator position (and hence the deflection of the spring lever 16) as feedback to the control algorithm 20 to form a closed loop control system. In general, the position transducer 14 is expensive, and as the clutch plates 17A, 17B, and 17C wear, compensating for variations between the position, d, and the actual force applied to the clutch plates becomes difficult for the system 10.

Referring now to FIG. 2, in accordance with principles of the present invention, the clutch control system 100 includes a clutch assembly 109 and a hydraulic actuator 110. The clutch assembly 109 includes a set of clutch plates 109A, 109B, and 109C and a diaphragm spring lever 108. The diaphragm spring lever 108 is in contact with the clutch plate 109A and is coupled to the hydraulic actuator 110 with an applied bearing 115 near or at the distal end of the diaphragm spring lever 108. The diaphragm spring lever 108 is significantly stiffer than the conventional spring lever 16 to minimize the deflection at the distal end of the spring lever 108 when a force is applied to it. For example, in certain implementations the distal end of the spring lever 108 has a deflection from about 2 mm to about 5 mm, whereas the distal end of the conventional lever spring 16 described previously typically has a deflection of about 15 mm.

The system 100 also includes an internal model based force control algorithm 102 and a pressure control valve 106. During the operation of an associated dual clutch transmission, the clutch assembly 109 is controlled by a microprocessor. The microprocessor sends a signal, $F_d$, which is the desired clutch apply force, to the internal model based force control algorithm 102, which, in turn, converts the desired clutch apply force, $F_d$, to a control signal, P, for the pressure control valve 106. With the control signal, P, the pressure control valve applies pressure to the hydraulic actuator 110 such that the hydraulic actuator applies a desired force to the applied bearing 115 and hence the distal end of the spring lever 108. Accordingly, there is approximately a one-to-one correspondence between the pressure applied to the hydraulic actuator 110 and the force applied to the clutch plates 109A, 109B, and 109C.

Referring now to FIG. 3, the internal model based force control algorithm 102 includes an internal plant model 114 and a feed-forward/feedback control 112 for the internal plant model. The internal plant model 114 is a model of the actual plant 104: the pressure control valve 106, the hydraulic actuator 110, the spring lever 108, and the clutch plates 109A, 109B, and 109C stored in the microprocessor. Specifically, the internal plant model 114 includes the dynamics of the pressure control valve 106, the hydraulic actuator 110, the spring lever 108, the clutch plates 109A, 109B, and 109C, and the nonlinearities and hysteresis of the system 100.

During the operation of the dual clutch transmission, the aforementioned microprocessor sends the desired clutch force signal, $F_d$, to the feed-forward/feedback control of the internal model 102, which, in turn, converts the desired clutch force, $F_d$, to the control signal, P. The pressure control signal, P, is sent to the pressure control valve 106 as well as the internal plant model 114. The internal plant model 114 then takes into account the actual plant dynamics along with the pressure control valve information, P, and transmits a signal 116 that is added or subtracted from the desired clutch force, $F_d$, at 118. T to form a closed loop control system. The modified desired clutch force, $F_d$, is then sent to the feed-forward/feedback control 112 so that there is direct control of the pressure signal, P, sent to the pressure control valve 106. The feed-forward/feedback control 112 allows the clutch force in the internal plant model 114 follow the clutch force, $F_d$, signal from the microprocessor in a desired manner.

A particular implementation of the internal model 102 is shown in FIG. 4. The internal model 102 includes a gain 120, an integrator 126, a first function 122 (F1), and a second function 124 (F2). The integrator 126 is a typical mathematical integrator, the gain 120 generates a gain signal, k, which determines the response speed of the internal model 102, the first function 122 maps the steady-state actual clutch force to the hydraulic pressure in the hydraulic actuator 110, and the second function 124 models the equivalent linear damping and friction characteristics of the actual plant 104. Each of the functions 122 and 124 can be a proportional gain function, a look-up table, or a non-linear relationship.

When the internal model 102 is in operation, the integrator 126 integrates the signal from the gain 120 and sends the integrated output to the first function 122 and as a feedback signal that is added or subtracted from the desired clutch force, $F_d$, at 118 to form the closed loop control system. The information from 118 is fed into the gain 120 which in addition to feeding information to the integrator 126 sends information to the second function 124. The signal from the first function 122 and the signal from the second function 124 are added together at 128 to form the control signal, P, for the pressure control valve 106 of the actual plant 104.

The description of the invention is merely exemplary in nature and variations that do not depart from the gist of the invention are intended to be within the scope of the invention. Such variations are not to be regarded as a departure from the spirit and scope of the invention.

What is claimed is:

1. A control system for controlling clutches of a dual clutch transmission comprising:
   an internal model based force control algorithm that converts a desired clutch force to a pressure control signal, the internal model including a gain, an integrator, a first function and a second function;
   a pressure control valve that receives the pressure control signal;
   a hydraulic actuator, the pressure control valve applying pressure to the hydraulic actuator, the applied pressure being related to the pressure control signal; and
   a clutch assembly with a stiff spring lever and a plurality of clutch plates, wherein the hydraulic actuator applies a force corresponding to the pressure control signal to a distal end of the spring lever, and wherein the force applied to the distal end of the spring lever imparts an actual force to the clutch plates,
   wherein the first function maps a steady state actual clutch force to the pressure in the hydraulic actuator corresponding to the pressure control signal sent to the pressure control valve, the hydraulic actuator applying a pressure to a spring lever which in turn imparts an actual clutch force to a plurality of clutch plates, and
   wherein the second function models the linear damping and friction characteristics of the pressure control valve, the hydraulic actuator, the spring lever, and the plurality of clutch plates.

2. The control system of claim 1 wherein hydraulic actuator and the spring lever are coupled together with an applied bearing.

3. The control system of claim 1 wherein the internal model based force control algorithm includes an internal plant model.

4. The control system of claim 3 wherein the internal plant model is a model of the pressure control valve, the hydraulic actuator, the spring lever, and the plurality of clutch plates.

5. The control system of claim 4 wherein the internal plant model is stored in a microprocessor.

6. The control system of claim 3 wherein the internal plant model includes the dynamics of the pressure control valve, the hydraulic actuator, the spring lever, the plurality of clutch plates, and the nonlinearities and hysteresis of the control system.

7. The control system of claim 3 wherein a signal from the internal plant model is added or subtracted from the desired clutch force, the resulting modified desired clutch force signal being transmitted to a feed-forward/feedback control which generates the pressure control signal that is transmitted to the pressure control valve and the internal plant model.

8. The control system of claim 1 wherein the internal model based force control algorithm includes a gain, an integrator, a first function, and a second function.

9. The control system of claim 8 wherein the gain determines a response speed of the internal model.

10. The control system of claim 8 wherein the first function maps a steady state actual clutch force to the pressure in the hydraulic actuator.

11. The control system of claim 10 wherein the first function is a proportional gain function, a look-up table, or a nonlinear function.

12. The control system of claim 8 wherein the second function models the linear damping and friction characteristics of the pressure control valve, the hydraulic actuator, the spring lever, and the plurality of clutch plates.

13. The control system of claim 12 wherein the second function is a proportional gain function, a look-up table, or a nonlinear function.

14. The control system of claim 1 wherein the gain determines a response speed of the internal model.

* * * * *